US012162071B2

(12) United States Patent
Liang et al.

(10) Patent No.: US 12,162,071 B2
(45) Date of Patent: Dec. 10, 2024

(54) METAL WICK MATERIAL WITH HIERARCHICAL POROUS STRUCTURES AND ITS FABRICATION METHOD

(71) Applicant: SHANGHAI JIAO TONG UNIVERSITY, Shanghai (CN)

(72) Inventors: Jiamiao Liang, Shanghai (CN); Jun Wang, Shanghai (CN); Baode Sun, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/219,879

(22) Filed: Jul. 10, 2023

(65) Prior Publication Data

US 2023/0347415 A1 Nov. 2, 2023

Related U.S. Application Data

(63) Continuation-in-part of application No. PCT/CN2021/115922, filed on Sep. 1, 2021.

(30) Foreign Application Priority Data

Jan. 11, 2021 (CN) .......................... 202110031731.2

(51) Int. Cl.
*B22F 10/38* (2021.01)
*B22F 1/10* (2022.01)
(Continued)

(52) U.S. Cl.
CPC ............... *B22F 10/38* (2021.01); *B22F 1/10* (2022.01); *B22F 10/10* (2021.01); *B22F 10/64* (2021.01);
(Continued)

(58) Field of Classification Search
CPC .................................. B22F 10/18; B22F 7/002
See application file for complete search history.

(56) References Cited

U.S. PATENT DOCUMENTS

| 11,535,360 B1* | 12/2022 | Roper ..................... F28F 13/18 |
| 2006/0211802 A1* | 9/2006 | Asgari .................... B22F 7/004 |
| | | 524/439 |
| 2011/0129640 A1 | 6/2011 | Beall |
| 2017/0241287 A1* | 8/2017 | Nakamura ............ B22F 3/1021 |

(Continued)

FOREIGN PATENT DOCUMENTS

| CN | 102634687 A | 8/2012 |
| CN | 104075603 A | 10/2014 |

(Continued)

OTHER PUBLICATIONS

International Search Report and Written Opinion for PCT/CN2021/115922; mailed Dec. 2, 2021 in Chinese with English Translation (17 pages).

*Primary Examiner* — Alexandra M Moore
*Assistant Examiner* — Austin Pollock
(74) *Attorney, Agent, or Firm* — FITCH EVEN TABIN & FLANNERY, LLP

(57) ABSTRACT

A metal wick material with hierarchical porous structures, which comprises primary pores, secondary pores, and tertiary pores, wherein the pore sizes of the primary pores are greater than those of the secondary pores and the pore sizes of the secondary pores are greater than those of the tertiary pores; the primary pores are obtained by 3D printing, the secondary pores are obtained by volatilizing a binder during a water bath heating process; and the tertiary pores are obtained by forming pores by diffusion and connection among metal powder particles during sintering. A method for fabricating the metal wick material having hierarchical porous structure, comprising: fabricating ordered primary pores having a three-dimensional network structure by a new-type powder extrusion 3D printing process; and then (Continued)

forming secondary pores and tertiary pores inside a macroporous framework by using subsequent treatment processes such as water bath heating and sintering, thus constructing a three-stage pore material.

4 Claims, 7 Drawing Sheets

(51) Int. Cl.
*B22F 10/10* (2021.01)
*B22F 10/64* (2021.01)
*B33Y 10/00* (2015.01)
*B33Y 70/10* (2020.01)
*B33Y 80/00* (2015.01)

(52) U.S. Cl.
CPC .............. *B33Y 10/00* (2014.12); *B33Y 70/10* (2020.01); *B33Y 80/00* (2014.12); *B22F 2998/10* (2013.01)

(56) References Cited

U.S. PATENT DOCUMENTS

| | | | |
|---|---|---|---|
| 2018/0281062 A1* | 10/2018 | Cha | C22C 33/0285 |
| 2019/0118264 A1* | 4/2019 | Qi | B22F 10/38 |
| 2019/0393576 A1* | 12/2019 | Sunada | H01M 10/6554 |
| 2021/0148645 A1* | 5/2021 | Shuck | B22F 10/00 |

FOREIGN PATENT DOCUMENTS

| | | | | |
|---|---|---|---|---|
| CN | 106891007 A | | 6/2017 | |
| CN | 107584631 A | | 1/2018 | |
| CN | 108101574 A | | 6/2018 | |
| CN | 109807320 A | | 5/2019 | |
| CN | 110243213 A | | 9/2019 | |
| CN | 110357657 A | | 10/2019 | |
| CN | 110385436 A | | 10/2019 | |
| CN | 110950651 A | | 4/2020 | |
| CN | 112872355 A | | 6/2021 | |
| EP | 3184207 A1 | * | 6/2017 | |
| JP | 2019524981 A | * | 9/2019 | |
| WO | WO-2020006237 A1 | * | 1/2020 | B33Y 40/00 |
| WO | WO-2021074129 A1 | * | 4/2021 | B22F 1/10 |
| WO | 2022148032 A1 | | 7/2022 | |

* cited by examiner

Mixing metal powder particles with a binder to prepare a powder feed

Subjecting the powder feed to 3D printing to obtain a primary green body

Performing water bath heating to remove the binder to obtain a secondary green body Drying the secondary green body to obtain a tertiary green body Sintering the tertiary green body in vacuum or reducing atmosphere to obtain a wick material

*Fig. 11*

METAL WICK MATERIAL WITH HIERARCHICAL POROUS STRUCTURES AND ITS FABRICATION METHOD

RELATED APPLICATIONS

This application is a continuation-in-part (CIP) application of PCT/CN2021/115922 filed on Sep. 1, 2021, which claims priority to Chinese Patent Application No. 202110031731.2 filed on Jan. 11, 2021, the disclosures of which are incorporated herein in their entirety by reference.

TECHNICAL FIELD

The present application relates to the field of additive manufacturing, in particular to a metal wick material with hierarchical porous structures and its fabrication method.

BACKGROUND ART

Heat pipe is a device that conducts heat rapidly by using heat conduction and phase change medium. Compared with traditional heat sinks, it has advantages of a strong thermal conductivity, a good temperature uniformity, etc., and has important application prospects in fields such as aerospace, energy chemical industry and electronic industry. A wick, an important part of the heat pipe, is made of a porous material, and the porous structure thereof is closely related to the heat transfer performance of the heat pipe. The main functions of the wick are as follows: (1) a channel for a condensate to flow back from a condensation section to an evaporation section is provided; (2) a capillary force generated by surface capillary pores at a vapor-liquid interface can help the condensate flow back; and (3) a heat flow path is provided between the inner wall of a shell and the vapor-liquid interface. Therefore, improving the porous structure of the wick to improve the capillary capacity of the wick becomes the key to improve the performance of the heat pipe.

How to improve the capillarity of the wick has always been a hot spot of research in the field of materials and engineering thermophysics. The capillarity of the wick is determined jointly by two performance indicators: permeability and capillary pressure. Permeability is a physical quantity that characterizes the opening degree of the wick. The larger the pore size, the higher the permeability, and the smaller the energy required for a liquid to pass through the wick. Capillary pressure is a physical quantity that characterizes the suction force of the wick for a liquid. The smaller the pore size, the greater the capillary force, and the greater the driving force on the liquid when passing through the wick. Therefore, neither simply increasing nor decreasing the pore size in the wick can simultaneously improve the permeability and capillary pressure of the wick, which leads to an inverted relationship between the permeability and capillary pressure of the wick having a porous structure. Therefore, how to improve the permeability and capillary pressure simultaneously by designing the aperture structure is a key problem in the research of a wick for heat pipes.

In order to overcome the contradiction between permeability and capillary pressure, it is necessary to make the wick contain simultaneously two or even more stages of pores with different pore sizes. A pore-forming agent method is a common method for fabricating a hierarchical porous structure. The process route of this method involves: firstly, uniformly mixing a pore-forming agent and metal powders, then sintering the mixed powder, and finally removing the pore-forming agent by dissolution or thermal volatilization depending on the properties thereof. For example, some scholars mixed and sintered sodium chloride crystal with metal powders, then immersed the sintered product in water to dissolve sodium chloride, and finally obtained a porous structure with two types of pore size distributions. Sodium chloride crystal, which acts as a pore-forming agent, forms macropores after dissolution, and voids resulting from metal powders by diffusion and connection with each other form small holes. According to this process method, a wick material having a structure of two or even more stages of pores can be obtained, and the pore size can also be regulated by controlling the size of pore-forming agent particles. However, the disadvantage of this process method lies in that the obtained hierarchical porous structure is randomly distributed, which increases the length of capillary channels and the probability of closed pores in the material and thus greatly reduces the working efficiency of the wick.

SUMMARY OF THE INVENTION

In view of the above defects in the prior art, the technical problem to be solved in the present application is to provide a metal wick material having a hierarchical porous structure with controllable pore size and void distribution and a fabrication method therefor.

Surprisingly, by means of 3D powder extrusion printing technology in combination with subsequent degreasing and sintering processes, a hierarchical porous structure with controllable pore size and void distribution can be fabricated, thus breaking through the problem that the current process cannot regulate the size and distribution of hierarchical pores.

In one aspect of the present application, provided is a method for fabricating a metal wick material with hierarchical porous structures, which comprises primary pores, secondary pores, and tertiary pores, wherein the pore sizes of the primary pores are greater than the pore sizes of the secondary pores and the pore sizes of the secondary pores are greater than the pore sizes of the tertiary pores; the primary pores are obtained by 3D printing and the secondary pores are obtained by volatilizing a binder during a water bath heating process; and the tertiary pores are obtained by forming voids by diffusion and connection among metal powder particles during sintering;

the method comprising the following steps:
Step 1: mixing the metal powder particles with the binder to prepare a powder feed;
Step 2. carrying out 3D printing on the powder feed according to a preset three-dimensional net structure model to obtain a primary green body;
Step 3: subjecting the primary green body to water bath heating to remove the binder from the primary green body to obtain a treated secondary green body;
Step 4. drying the treated secondary green body to obtain a tertiary green body; and
Step 5: sintering the tertiary green body in a vacuum or reducing atmosphere to obtain the metal wick material having a hierarchical porous structure.

Furthermore, the pore sizes of the primary pores are between 100 and 800 microns. The distribution and shape of the primary pores are determined by a preset three-dimensional net structure model, and the three-dimensional net structure model is determined by computer program settings during 3D printing. The pore sizes and porosity of the primary pores can be regulated depending on the spray diameter of a nozzle, printing infill rate, and rolling reduction of a 3D printing device.

Furthermore, the pore sizes of the secondary pores are between 30 and 80 microns. The pore sizes of the secondary pores are regulated by the content of the binder.

Furthermore, the pore sizes of the tertiary pores are between 1 and 10 microns. The pore sizes and porosity of the tertiary pores are regulated by the sintering temperature and the size of the metal powder particles.

Furthermore, in step 1, the volume fraction of the binder in the powder feed is between 40% and 60%.

Furthermore, the binder comprises polyethylene glycol, polyoxymethylene, and paraffin.

Furthermore, the metal is any one of a nickel-based alloy, copper, stainless steel, or a titanium alloy.

Furthermore, the particle size of the metal powder particles is less than or equal to 15 microns.

Furthermore, the powder feed is a subsphaeroidal feed with a particle size in a range of 1-5 mm.

Furthermore, the powder feed is prepared by a method of mixing, banburying, and granulation.

Furthermore, the spray diameter of the nozzle of the 3D printing is 0.1-0.8 mm, the printing infill rate is 40-80%, and the layer thickness (rolling reduction) is 0.1-0.4 mm, preferably 0.15-0.3 mm.

Furthermore, in step 3, the temperature of the water bath heating is 50-70° C. and the heating time is 24-48 h. The specific heating temperature can be regulated depending on the type and amount of the binder.

Furthermore, in step 4, the drying is carried out under vacuum.

Furthermore, in step 4, the drying temperature is 50-80° C., and the drying time is 2-5 h.

Furthermore, in step 5, the reducing atmosphere is a mixed atmosphere of $H_2$ and Ar.

Preferably, the volume content of $H_2$ in the reducing atmosphere is 5%.

Furthermore, in step 5, the sintering temperature is 800-1300° C., preferably 1100-1200° C., and the time is 1-4 h, preferably 1-2 h. The specific sintering temperature and time can be determined depending on the type of the metal powder.

In a second aspect of the present application, provided is a metal wick material with hierarchical porous structures fabricated by the above-mentioned method, which comprises primary pores, secondary pores, and tertiary pores, wherein the pore sizes of the primary pores are greater than the pore sizes of the secondary pores and the pore sizes of the secondary pores are greater than the pore sizes of the tertiary pores; the primary pores are obtained by 3D printing and the secondary pores are obtained by volatilizing a binder during a water bath heating process; and the tertiary pores are obtained by forming voids by diffusion and connection among metal powder particles during sintering.

Furthermore, the pore sizes of the primary pores are between 100 and 800 microns, the pore sizes of the secondary pores are between 30 and 80 microns, and the pore sizes of the tertiary pores are between 1 and 10 microns.

Furthermore, the metal is any one of a nickel-based alloy, copper, stainless steel, or a titanium alloy.

Furthermore, the shape of the primary pores is any one or more of a square, a hexagon, or a circle.

In a third aspect of the present application, provided is the application of the above-mentioned metal wick material having a hierarchical porous structure in a heat pipe.

The metal wick material having a hierarchical porous structure and the fabrication method therefor as provided by the present application have the following beneficial technical effects:
1. In the present application, 3D powder extrusion printing technology is used, combined with subsequent degreasing and sintering processes, which avoids disordered pore size distribution caused by traditional powder sintering and adding a pore-forming agent, and a three-stage pore structure with ordered void distribution is obtained. The method is novel and simple and can be used for industrial production.
2. The pores with ordered void distribution and three different sizes in the metal wick material have a synergistic effect, which can improve both the permeability and capillary rate of the wick, and the capillarity thereof is obviously higher than that of hierarchical porous wick materials with single pore sizes and random pore size distributions, thus greatly improving the working efficiency of the heat pipe.

The concept, specific structure, and produced technical effects of the present application will be further explained in conjunction with the attached drawings, so as to fully understand the object, characteristics, and effects of the present application.

BRIEF DESCRIPTION OF THE DRAWINGS

FIG. 2 is a schematic diagram of a metal wick material with a grid-shaped structure obtained in a preferred example of the present application, wherein FIG. 2A is a sectional view of the metal wick material with a grid-shaped structure, FIG. 2B is a low-power scanning electron microscope photograph of a vertical section of the metal wick material with a grid-shaped structure, and FIG. 2C is a low-power scanning electron microscope photograph of a cross section of the metal wick material with a grid-shaped structure;

FIG. 11 is a flow chart of the method for fabricating a metal wick material having a hierarchical porous structure of the present application.

Figure 1:
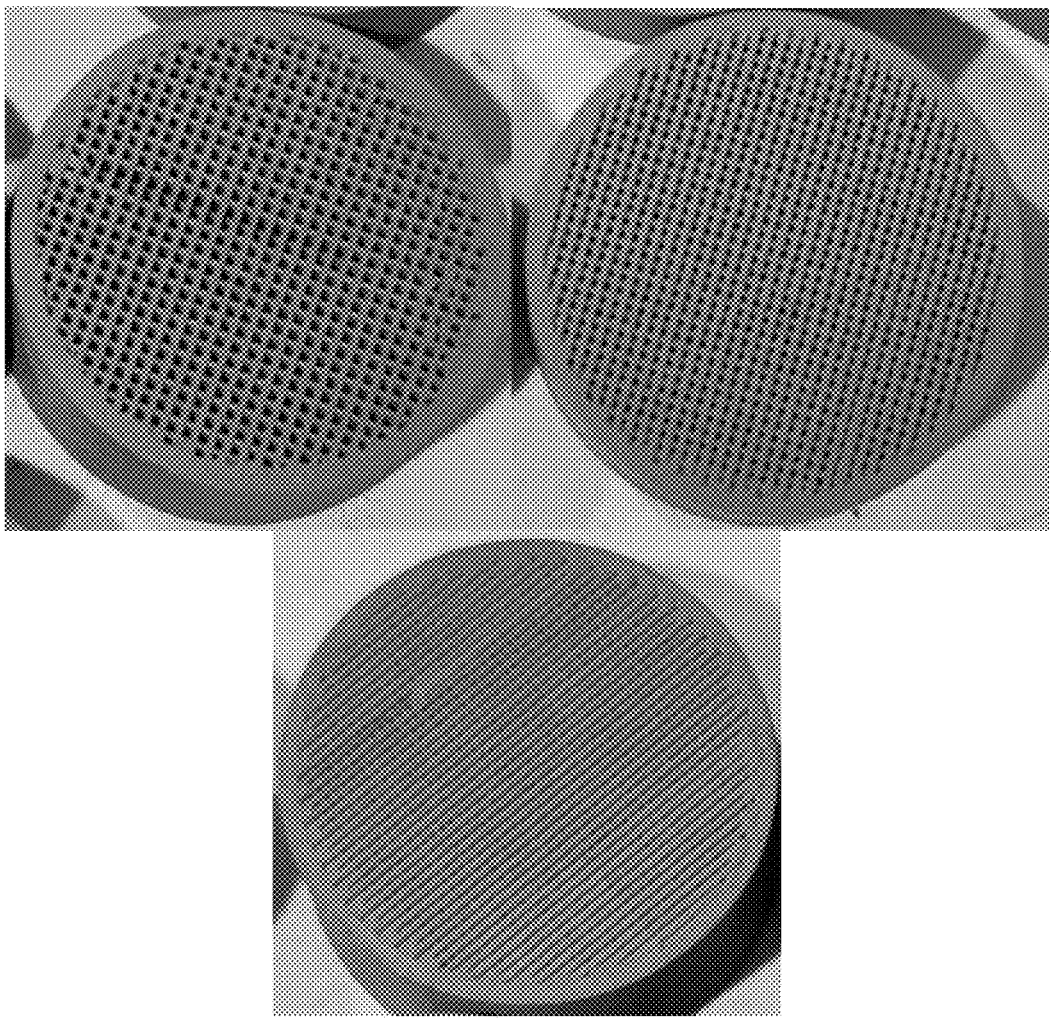
FIG. 1 is a schematic diagram of a hierarchical porous metal wick material sample of the present application.

In the drawings: 1-primary pores; 2-secondary pores; and 3-tertiary pores.

DETAILED DESCRIPTION OF EMBODIMENTS

Several preferred examples of the present application are presented below with reference to the attached drawings of the description, so as to make the technical content more clear and easier to understand. The present application can be embodied by many different forms of examples, and the scope of protection of the present application is not limited to the examples mentioned herein.

The metal wick material having a hierarchical porous structure as provided by the present application is as shown in FIGS. 1-8, wherein the metal wick material is a three-dimensional net structure, comprising primary pores 1, secondary pores 2, and tertiary pores 3. The pore sizes of the primary pores 1 are greater than those of the secondary pores 2 and the pore sizes of the secondary pores 2 are greater than those of the tertiary pores 3.

The primary pores 1 are obtained by 3D printing, the pore sizes are between 100 and 800 microns, and the shape thereof is any one of a square, a hexagon, or a circle.

The secondary pores 2 is obtained by volatilizing the binder during water bath heating, and the pore sizes are between 30 and 80 microns.

The tertiary pores 3 are obtained by forming voids by diffusion and connection among metal powder particles during sintering, and the pore sizes thereof are between 1 and 10 microns.

The metal in the metal wick material is any one of a nickel-based alloy, copper, stainless steel, or a titanium alloy.

EXAMPLE 1

A method for fabricating a nickel-based alloy wick material with hierarchical porous structures, as shown in FIG. 11, and the method comprises:
  Step 1: a volume fraction of 40% of a binder (the main ingredients were polyethylene glycol, polyoxymethylene, and paraffin) and a volume fraction of 60% of a nickel-based alloy powder (grade K438, with a particle size of 0-15 microns) were respectively weighed, and then mixed, banburied, and granulated to prepare a subsphaeroidal powder feed with a particle size between 1 and 5 mm.
  Step 2: the prepared powder feed, which acted as a raw material, was subjected to powder extrusion 3D printing depending on a preset three-dimensional grid structure model to obtain a printing green body, wherein the spray diameter of a nozzle during 3D printing was 0.6 mm, the infill rate was 40%, and the layer thickness was 0.3 mm; and the printing green body was a three-dimensional interconnected grid-shaped structure;
  Step 3: the printed green body obtained by 3D printing was subjected to water bath heating, wherein the temperature of the water bath was 50° C., and the temperature was kept for 48 h;
  Step 4: the green body heated in the water bath was dried in a vacuum drying oven at a drying temperature of 50° C. for 2 h; and
  Step 5: the dried green body was placed in a tubular furnace for heating and sintering, wherein the sintering atmosphere was a mixed gas of $H_2$ and Ar in which the volume content of $H_2$ was 5%, the sintering temperature was 1100° C., and the temperature was kept for 2 hours.

Figure 2:
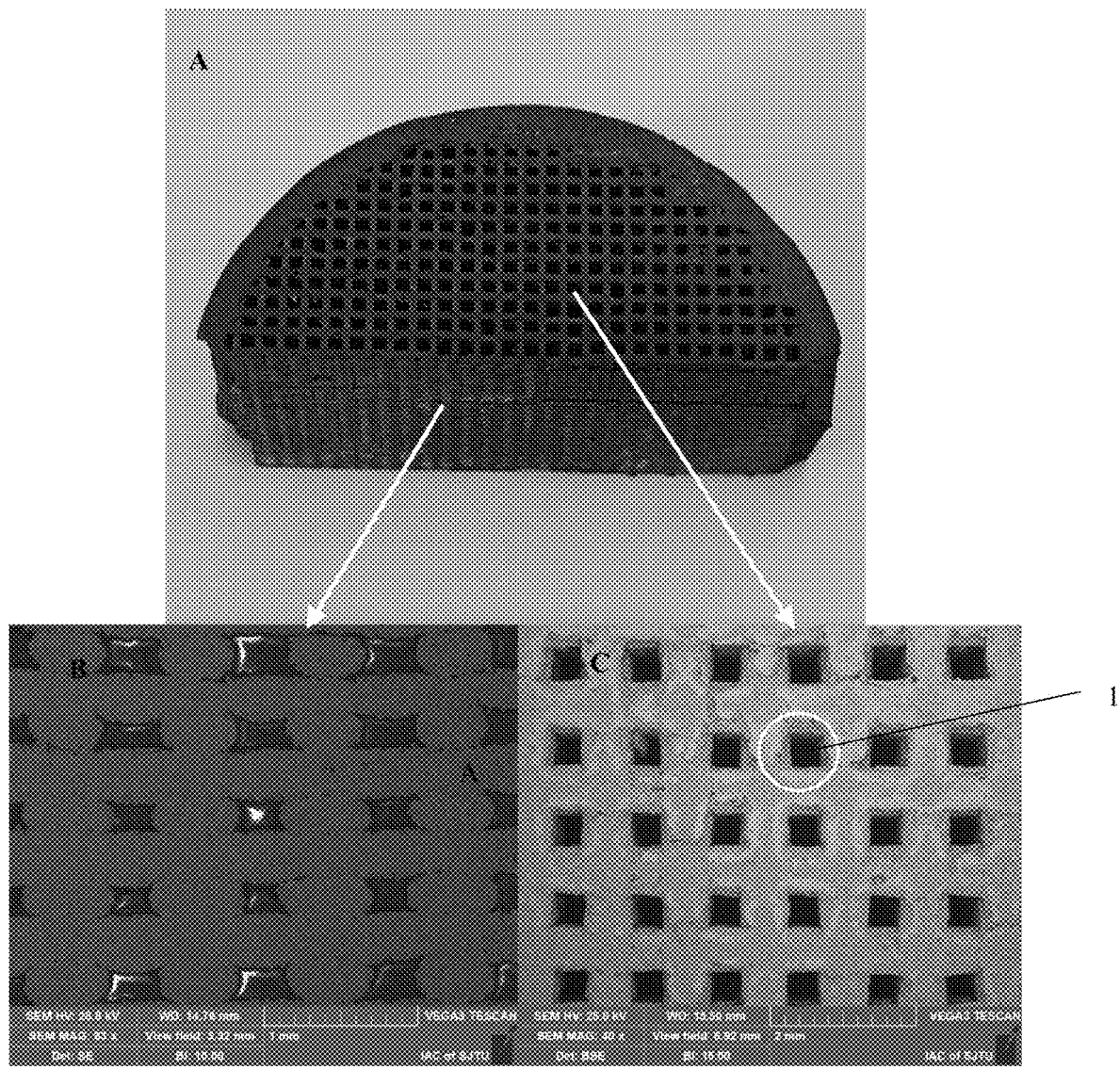
Figure 3:
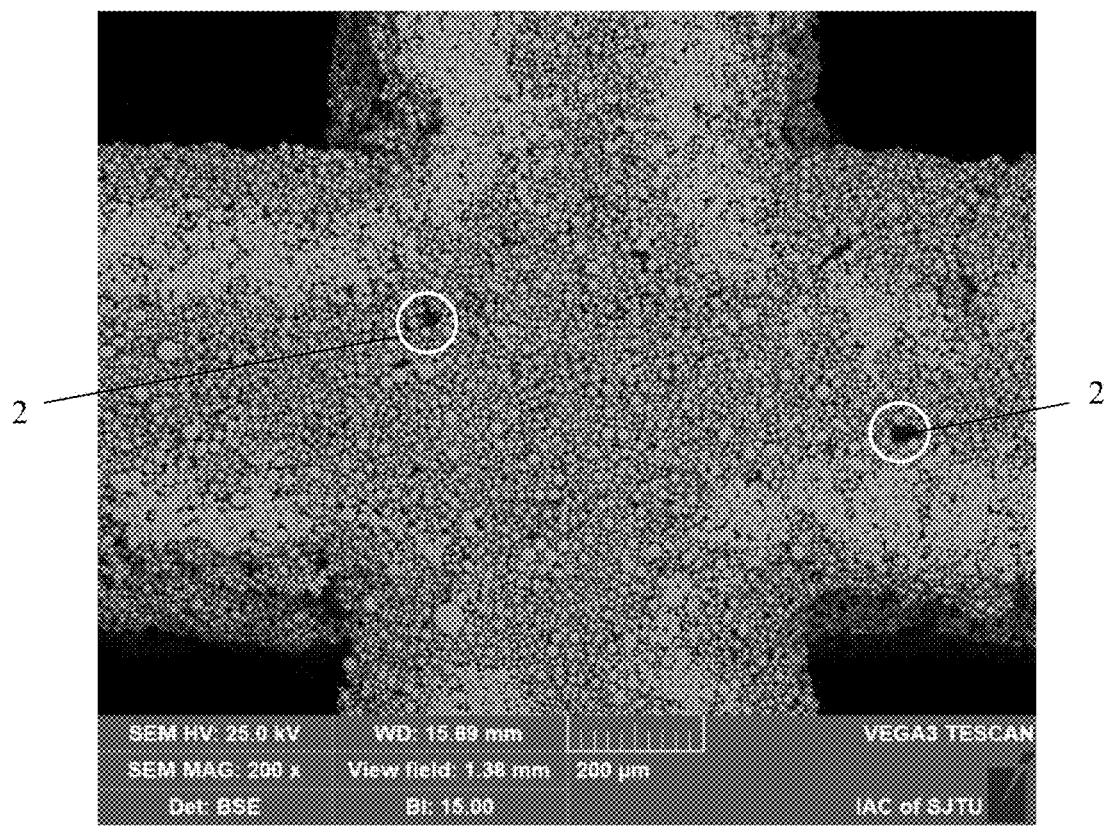
FIG. 3 is a scanning electron microscope photograph of the joint of the metal framework of the metal wick material obtained in a preferred example of the present application.
Figure 4:
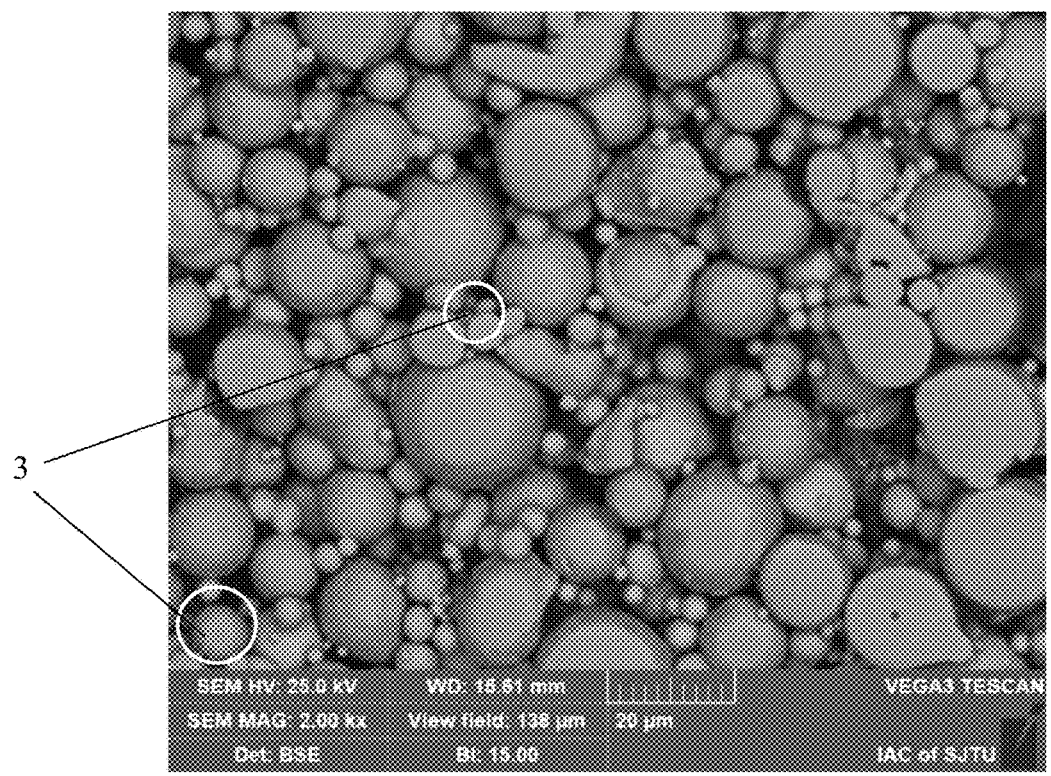
FIG. 4 is a scanning electron microscope photograph in the metal framework of the metal wick material obtained in a preferred example of the present application.

The macroscopic structure of the wick obtained in Example 1 was characterized by a scanning electron microscope and as shown in FIG. 2, which showed that the wick material obtained by powder extrusion 3D printing had a three-dimensional net structure, and the pores obtained by 3D printing were primary pores 1, which were orderly distributed and had pore sizes of about 500 microns. By enlarging the joint of the metal framework of the wick, it could be seen that as shown in FIG. 3, the surface at the joint presented a concave-convex shape of the metal powder. This was because pressureless sintering was used in the sintering process of the present application and the metal powders were connected with each other only by diffusion. In addition, secondary pores 2 remaining after the volatilization of the binder could be seen in FIG. 3, and the pore sizes thereof were 30-80 microns. By further enlarging the metal framework part, as shown in FIG. 4, tertiary pores 3 formed in the metal framework by diffusion and connection among metal powders could be seen and the pore sizes thereof were 1-10 microns.

EXAMPLE 2

A method for fabricating a nickel-based alloy wick material with hierarchical porous structures, as shown in FIG. 11, and the method comprises:
  Step 1: a volume fraction of 50% of a binder (the main ingredients were polyethylene glycol, polyoxymethylene, and paraffin) and a volume fraction of 50% of a nickel-based alloy powder (grade K418, with a particle size of 0-15 microns) were respectively weighed and then mixed, banburied, and granulated to prepare a subsphaeroidal powder feed with a particle size between 1 and 5 mm;
  Step 2: the prepared powder feed, which acted as a raw material, was subjected to powder extrusion 3D printing depending on a preset three-dimensional net structure model to obtain a printing green body, wherein the spray diameter of a nozzle during 3D printing was 0.6 mm, the infill rate was 70%, and the layer thickness was 0.3 mm; and the printing green body was a three-dimensional interconnected grid-shaped structure;
  Step 3: the printed green body obtained by 3D printing was subjected to water bath heating, wherein the temperature of the water bath was 60° C., and the temperature was kept for 48 h;
  Step 4: the green body heated in the water bath was dried in a vacuum drying oven at a temperature of 70° C. for 5 h; and
  Step 5: the dried green body was placed in a tubular furnace for heating and sintering, wherein the sintering atmosphere was a mixed gas of $H_2$ and Ar in which the volume content of $H_2$ was 5%, the sintering temperature was 1200° C., and the temperature was kept for 1 hour.

Figure 5:
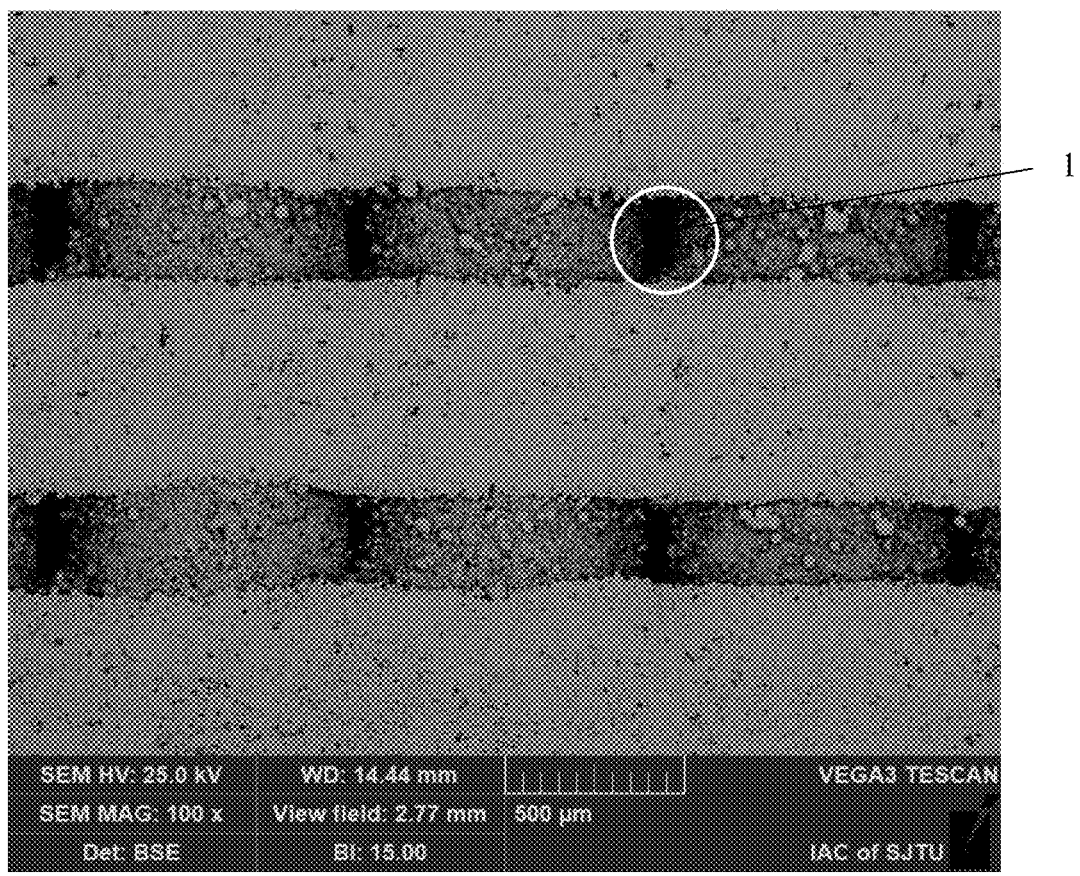
FIG. 5 is a low-power scanning electron microscope photograph of the metal wick material with a grid-shaped structure obtained in a preferred example of the present application.
Figure 6:
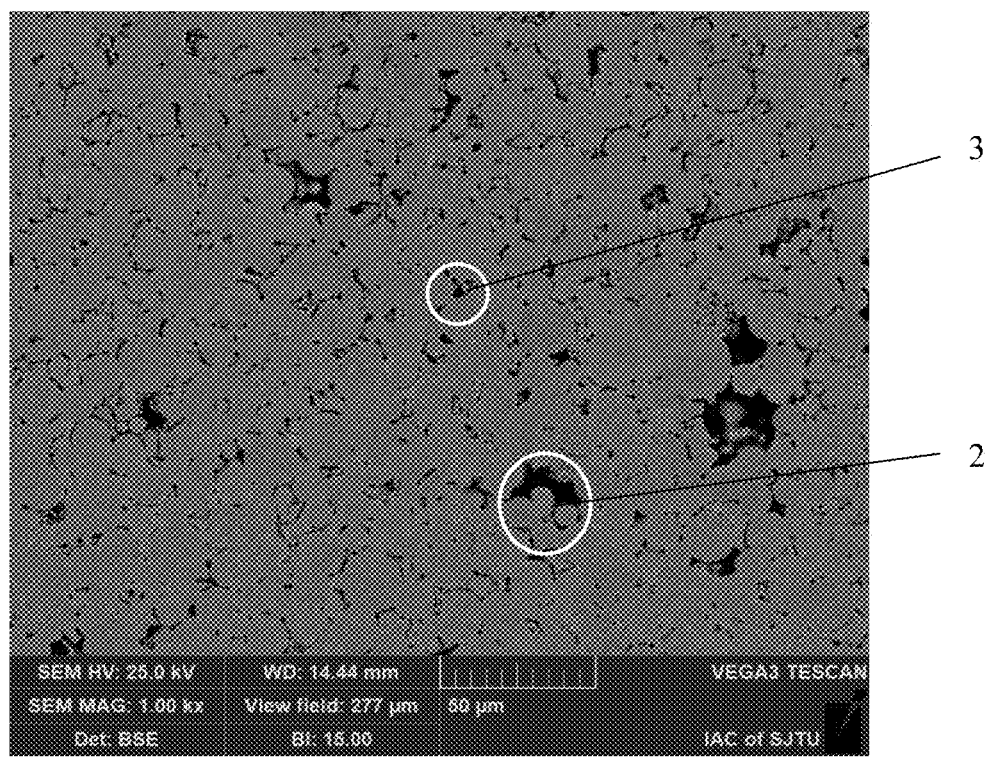
FIG. 6 is a scanning electron microscope photograph inside the metal framework of the metal wick material obtained in a preferred example of the present application.

The macroscopic structure of the wick obtained in Example 2 was characterized by a scanning electron microscope and as shown in FIG. 5, which showed that the wick material obtained by powder extrusion 3D printing had a three-dimensional grid-shaped structure, and the pores obtained by 3D printing were primary pores 1, which were orderly distributed and had pore sizes of 100-150 microns. By enlarging the metal framework of the wick, as shown in FIG. 6, it could be seen therefrom that holes with two pore sizes were included in the metal framework, that is, the secondary pores 2 remaining after the volatilization of the binder and the tertiary pores 3 formed by diffusion and connection among metal powders.

EXAMPLE 3

A method for fabricating a nickel-based alloy wick material with hierarchical porous structures, as shown in FIG. 11, and the method comprises:

Step 1: a volume fraction of 60% of a binder (the main ingredients were polyethylene glycol, polyoxymethylene, and paraffin) and a volume fraction of 40% of a nickel-based alloy powder (grade K418B, with a particle size of 0-15 microns) were respectively weighed and then mixed, banburied, and granulated to prepare a subsphaeroidal powder feed with a particle size between 1 and 5 mm;

Step 2: the prepared powder feed, which acted as a raw material, was subjected to powder extrusion 3D printing depending on a preset three-dimensional net structure model to obtain a printing green body, wherein the spray diameter of a nozzle during 3D printing was 0.6 mm, the infill rate was 80%, and the layer thickness was 0.15 mm; and the printing green body was a three-dimensional interconnected grid-shaped structure;

Step 3: the printed green body obtained by 3D printing was subjected to water bath heating, wherein the temperature of the water bath was 70° C., and the temperature was kept for 32 h;

Step 4: the green body heated in the water bath was dried in a vacuum drying oven at a temperature of 80° C. for 4 h; and Step 5: the dried green body was placed in a tubular furnace for heating and sintering, wherein the sintering atmosphere was a mixed gas of $H_2$ and Ar in which the volume content of $H_2$ was 5%, the sintering temperature was 1150° C., and the temperature was kept for 2 hours.

Figure 7:
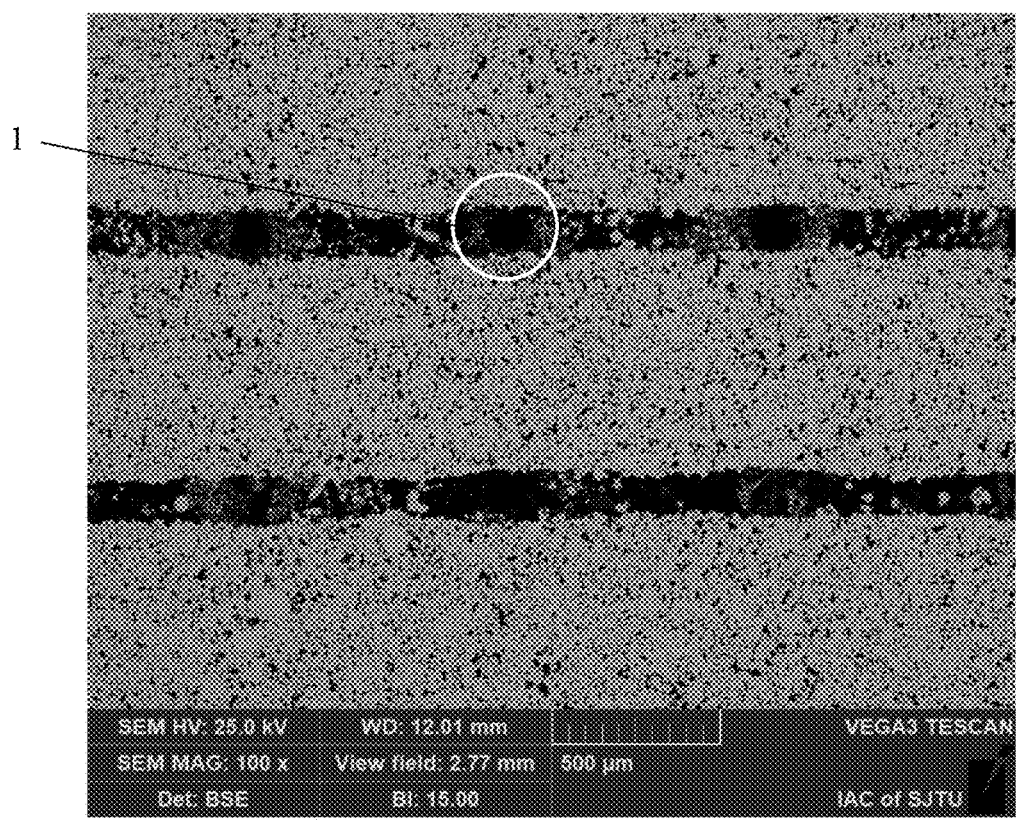
FIG. 7 is a low-power scanning electron microscope photograph of the metal wick material with a grid-shaped structure obtained in a preferred example of the present application.
Figure 8:
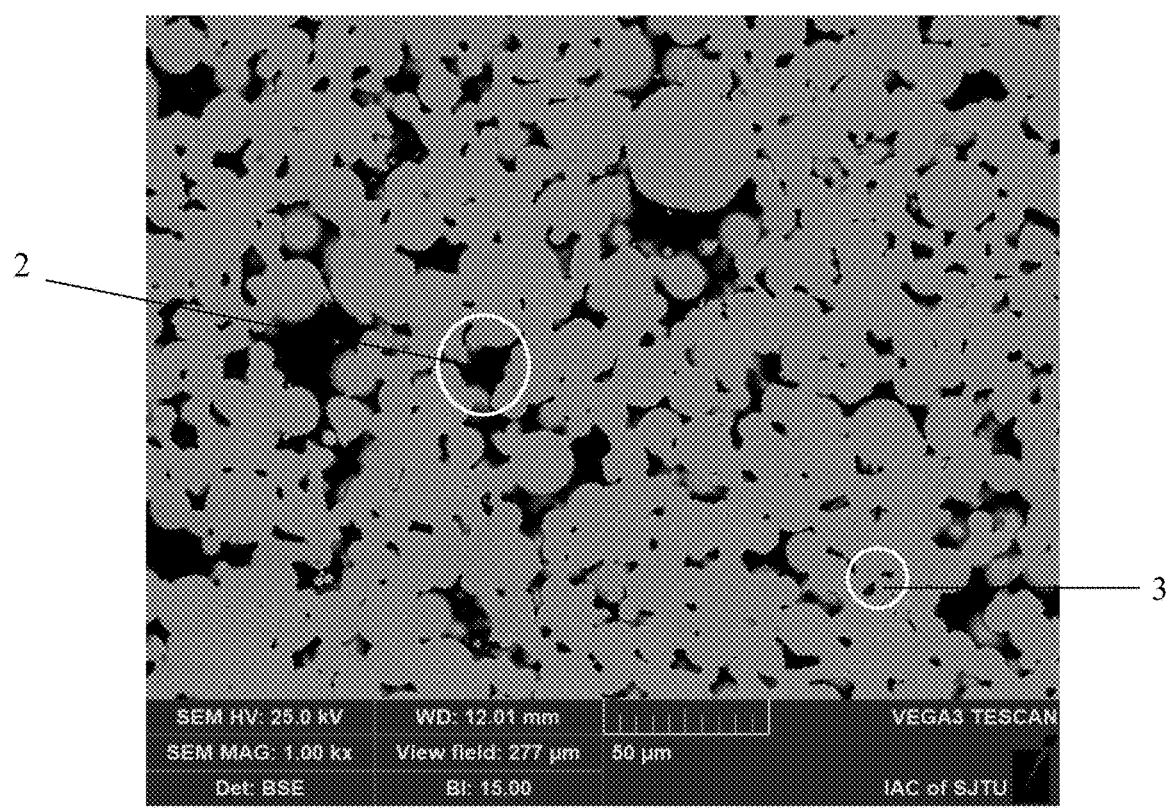
FIG. 8 is a scanning electron microscope photograph in the metal framework of the metal wick material obtained in a preferred example of the present application.

The macroscopic structure of the wick obtained in this example was characterized by a scanning electron microscope and as shown in FIG. 7, which showed that the wick material obtained by powder extrusion 3D printing had a three-dimensional net structure, and the pores obtained by 3D printing were primary pores 1, which were orderly distributed and had pore sizes of 150-250 microns. By enlarging the metal framework of the wick, as shown in FIG. 8, it could be seen therefrom that holes with two pore sizes were included in the metal framework, that is, the secondary pores 2 remaining after the volatilization of the binder and the tertiary pores 3 formed by diffusion and connection among metal powders.

EXAMPLE 4

The nickel-based alloy wick materials having a hierarchical porous structure as prepared in Example 1-3 were compared in an experiment with a traditional mono-porous wick material for capillary performance and permeation performance. The traditional mono-porous wick material was prepared by a powder loose sintering process, and the pore size range thereof was 10-50 microns. The material was a K418 nickel-based high-temperature alloy. The overall structures of the wick materials prepared in Examples 1-3 of the present application and the overall structure of the traditional mono-porous wick were both cylindrical, and the overall sizes thereof were the same.

The capillary performance was characterized by capillary rate, and the test method was a capillary suction experiment. The specific steps of the test for each sample included: the bottom surface of each processed cylindrical test sample was brought into contact with a liquid working medium, the mass of the working medium suctioned in a capillary manner by each sample over time was measured by means of a computer software and a balance, a curve of capillary suction over time was plotted, and the capillary rate of each sample could be calculated according to the measured capillary curve.

The permeation performance was characterized by permeability, which was measured by means of a flow vs. differential pressure curve method. The specific steps of the test for each sample included: firstly, FBP-3I porous material performance detector was used to measure the flow of the fluid flowing through each sample as a function of differential pressure, plotting a curve, and then the permeability of each sample was calculated according to Darcy's law.

Figure 9:
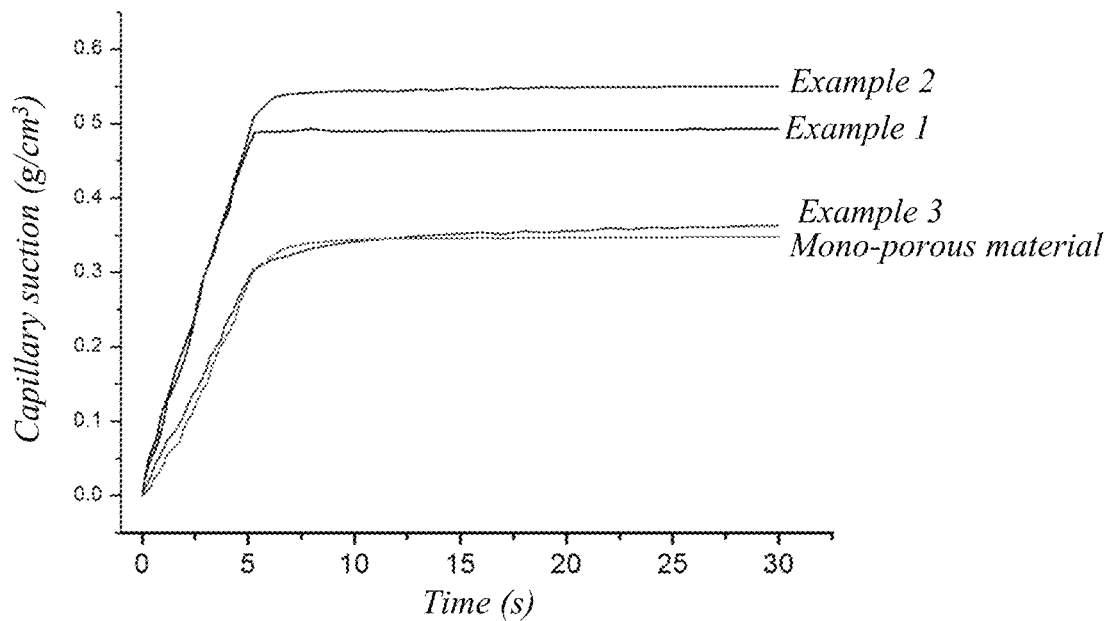
FIG. 9 is capillary curves of metal wick materials having a hierarchical porous structure of the present application.
Figure 10:
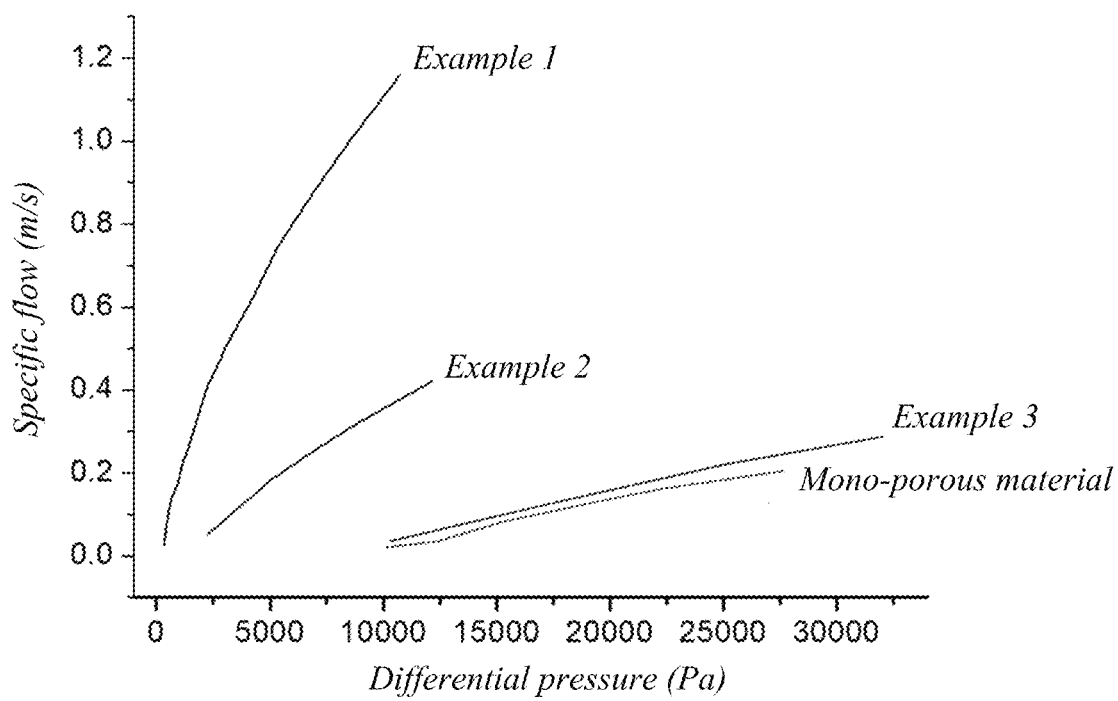
FIG. 10 is curves of the flow vs. differential pressure of the metal wick materials having a hierarchical porous structure in the present application.

The capillary curves measured for Examples 1-3 and the mono-porous material were as shown in FIG. 9, and the permeability curves were as shown in FIG. 10. The capillary rates and permeabilities of the samples as calculated by the capillary curves and permeability curves were as shown in Table 1. As could be seen from Table 1 and FIGS. 9 and 10, compared with the traditional mono-porous wick material, the hierarchical porous metal wick material prepared by the present application had obviously improved capillary rate and permeability, which could significantly improve the working efficiency of the heat pipe.

TABLE 1

Comparison of different samples for capillary rate and permeation performance

| Sample | Capillary rate ($g \cdot cm^{-3} \cdot s^{-1}$) | Permeability ($10^{-12} m^2$) |
|---|---|---|
| Example 1 | 0.25 | 23 |
| Example 2 | 0.33 | 7.8 |
| Example 3 | 0.18 | 1.6 |
| Mono-porous material | 0.14 | 1.1 |

The preferred examples of the present application have been described in detail above. It should be understood that by means of ordinary skill in the art, many modifications and variations can be made according to the concept of the present application without inventive effort. Therefore, any technical solution that can be obtained by a person skilled in the technical field through logical analysis, reasoning or limited experiments on the basis of the prior art and according to the concept of the present application should fall within the scope of protection defined by the claims.

The invention claimed is:

1. A method for fabricating a metal wick material with hierarchical porous structures, wherein the hierarchical porous structures are composed of different pore size ranges of large pores, medium pores and small pores, wherein pore sizes of the large pores are between 100 and 800 microns, pore sizes of the medium pores are between 30 and 80 microns, pore sizes of the small pores are between 1 and 10 microns;

wherein the large pores are obtained by 3D printing, the medium pores are obtained by volatilizing a binder during a water bath heating process, and the small pores are composed of voids among metal powder particles after sintering;

wherein the method comprises the following steps:

Step 1: mixing the metal powder particles with the binder to prepare a powder feed; wherein particle sizes of the metal powder particles are less than or equal to 15 microns, a volume fraction of the binder in the powder feed is between 40% and 60%, wherein the binder comprises polyethylene glycol, polyoxymethylene and paraffin, the powder feed is a subsphaeroidal feed with a particle size in a range of 1-5 mm and is prepared by means of mixing, banburying and granulation;

Step 2. printing on a powder extrusion 3D printing device according to a pre-designed three-dimensional net structure model with the powder feed obtained in Step 1, to obtain a printed green body; wherein a printing infill rate of the 3D printing is 40-80%, and a layer thickness is 0.1-0.4 mm;

Step 3: subjecting the printed green body obtained in Step 2 to the water bath heating to remove the binder from the printed green body to obtain a treated green body; wherein a temperature of the water bath heating is 50-70° C. and heating time is 24-48 h;

Step 4: drying the treated green body obtained in Step 3 to obtain a dried green body; and Step 5: sintering the dried green body obtained in Step 4 in a vacuum or reducing atmosphere to finally obtain the metal wick material with hierarchical porous structures.

2. The method for fabricating a metal wick material with hierarchical porous structures according to claim 1, wherein in Step 4, the drying is conducted in a vacuum.

3. The method for fabricating a metal wick material with hierarchical porous structures according to claim 1, wherein the metal powder particles in Step 1 are one of a nickel-based alloy, copper, stainless steel, or a titanium alloy.

4. The method for fabricating a metal wick material with hierarchical porous structures according to claim 1, wherein a temperature of the sintering is 800-1300° C., and a time of the sintering is 1-4 h.

* * * * *